(12) United States Patent
Harrison et al.

(10) Patent No.: US 8,574,519 B2
(45) Date of Patent: *Nov. 5, 2013

(54) PROCESSES FOR PREPARING HIGHLY PURE LITHIUM CARBONATE AND OTHER HIGHLY PURE LITHIUM CONTAINING COMPOUNDS

(75) Inventors: Stephen Harrison, Benicia, CA (US); Robert Blanchet, Palm Desert, CA (US)

(73) Assignee: Simbol, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,465

(22) Filed: Nov. 28, 2011

(65) Prior Publication Data

US 2012/0100056 A1    Apr. 26, 2012

Related U.S. Application Data

(63) Continuation of application No. 13/029,908, filed on Feb. 17, 2011, now Pat. No. 8,287,829.

(60) Provisional application No. 61/305,213, filed on Feb. 17, 2010.

(51) Int. Cl.
 *C01D 3/06* (2006.01)
(52) U.S. Cl.
 USPC .......................................... 423/186; 423/422
(58) Field of Classification Search
 USPC .......................................... 423/186, 421, 422
 See application file for complete search history.

(56) References Cited

U.S. PATENT DOCUMENTS

| | | | |
|---|---|---|---|
| 3,523,751 A | 8/1970 | Burkert et al. | |
| 4,016,075 A | 4/1977 | Wilkins | |
| 4,036,713 A | 7/1977 | Brown | |
| 5,219,550 A | 6/1993 | Brown et al. | |
| 5,932,644 A * | 8/1999 | Fujii | 524/424 |
| 5,935,541 A * | 8/1999 | Bonnet et al. | 423/301 |
| 5,939,043 A * | 8/1999 | Yahagi | 423/599 |
| 5,951,843 A | 9/1999 | Itoh et al. | |
| 6,048,507 A | 4/2000 | Amouzegar et al. | |
| 6,207,126 B1 | 3/2001 | Boryta et al. | |
| 6,592,832 B1 * | 7/2003 | Friedrich et al. | 423/179.5 |
| 7,026,072 B2 * | 4/2006 | Barker et al. | 429/322 |
| 7,060,238 B2 * | 6/2006 | Saidi et al. | 423/306 |
| 7,708,972 B2 | 5/2010 | Coustry et al. | |
| 2001/0028871 A1 * | 10/2001 | Harrison et al. | 423/421 |
| 2003/0228251 A1 | 12/2003 | Boryta et al. | |

(Continued)

FOREIGN PATENT DOCUMENTS

DE    19809420 A1    9/1999
GB    2190668 A    11/1987

(Continued)

OTHER PUBLICATIONS

JP2004-225144 Machine English Translation.*

(Continued)

*Primary Examiner* — Stanley Silverman
*Assistant Examiner* — Richard M Rump
(74) *Attorney, Agent, or Firm* — Bracewell & Giuliani LLP; Michael Samardzija

(57) ABSTRACT

The invention generally relates to methods of selectively removing lithium from various liquids, methods of producing high purity lithium carbonate, methods of producing high purity lithium hydroxide, and methods of regenerating resin.

14 Claims, 8 Drawing Sheets

(56) References Cited

U.S. PATENT DOCUMENTS

| | | |
|---|---|---|
| 2004/0005267 A1 | 1/2004 | Boryta et al. |
| 2004/0018135 A1* | 1/2004 | Adamson et al. ............. 423/313 |
| 2005/0011753 A1 | 1/2005 | Jackson et al. |
| 2006/0093911 A1* | 5/2006 | Chiga et al. ................... 429/224 |
| 2006/0115396 A1 | 6/2006 | Boryta et al. |
| 2006/0115407 A1 | 6/2006 | Boryta et al. |
| 2006/0115410 A1 | 6/2006 | Boryta et al. |
| 2007/0148077 A1 | 6/2007 | Boryta et al. |
| 2007/0160516 A1 | 7/2007 | Boryta et al. |
| 2008/0233042 A1 | 9/2008 | Boryta et al. |
| 2009/0214414 A1 | 8/2009 | Boryta et al. |

FOREIGN PATENT DOCUMENTS

| | | |
|---|---|---|
| JP | 2004225144 A  * | 8/2004 |
| JP | 2009046390 A  * | 3/2009 |
| RU | 2243157 C2 | 12/2004 |
| WO | 9929624 A1 | 6/1999 |
| WO | 2009131628 A1 | 10/2009 |

OTHER PUBLICATIONS

JP2009-046390 Machine English Translation.*

* cited by examiner

PROCESSES FOR PREPARING HIGHLY PURE LITHIUM CARBONATE AND OTHER HIGHLY PURE LITHIUM CONTAINING COMPOUNDS

RELATED APPLICATIONS

This application is a Continuation of application Ser. No. 13/029,908, filed on Feb. 17, 2011, which claims priority to U.S. Prov. Pat. App. Ser. No. 61/305,213, filed on Feb. 17, 2010, which is incorporated herein by reference in its entirety.

BACKGROUND OF THE INVENTION

1. Field of the Invention

The invention generally relates to the field of selectively preparing highly pure lithium carbonate and various other highly pure lithium containing compounds.

2. Description of the Related Art

Lithium carbonate ($Li_2CO_3$) is typically produced commercially from two sources: (1) the extraction from pegmatite mineral sources such as spodumene, lithiophyllite, or lepidolite, which can be obtained through traditional mining; and (2) extraction from lithium-containing brines, such as those found in the Salar de Atacama in Chile, Silver Peak Nevada, Salar de Uyuni in Bolivia, or the Salar de Hombre Muerte in Argentina. There are alternative brine sources, such as, geothermal, oilfield, Smackover, and relict hydrothermal brines. These brines, however, have not previously been commercially exploited.

There are a number of commercial applications for lithium carbonate including: use as an additive in aluminum smelting (molten salt electrolysis); enamels and glasses; to control manic depression (when used in its purer forms); and in the production of electronic grade crystals of lithium niobate, tantalite and fluoride. High purity lithium carbonate is required for the fabrication of several materials in lithium ion batteries, such as, the cathode materials and electrolyte salts, and also in more avant-garde secondary batteries which require highly pure lithium metal.

In the case of lithium ion batteries, purified lithium carbonate may be required for the fabrication of the cathode, as well as in the active materials for cathodes such as, and without limitation, lithium cobalt oxide, lithium manganese oxide or lithium iron phosphate, as well as, mixed metal oxides, such as, lithium cobalt nickel manganese oxide.

Several processes currently exist for the removal of lithium from lithium chloride-rich brines or other lithium containing liquids, however, none of the currently employed methods are suitable for the production of lithium carbonate containing low levels of magnesium and calcium, thus limiting the ability of the lithium carbonate to be used as a battery grade lithium product without first undergoing further purification. Methods for extracting lithium carbonate from mineral sources, such as spodumene or lithium aluminum silicate ore ($LiAlSi_2O_6$), similarly produce materials that lack sufficient purity for use in batteries. The purity of the resulting material using these processes is not sufficiently pure for battery grade lithium metal production, or for pharmaceutical grade lithium carbonate. Therefore, there is a need for a method for extracting lithium from lithium-containing brines and to produce lithium salts such as chloride and carbonate of sufficient purity to produce high-purity lithium metal.

SUMMARY OF THE INVENTION

In one aspect, the present invention is directed to a method of producing high purity lithium carbonate. The method includes the steps of reacting a first aqueous solution that includes a technical grade $Li_2CO_3$ with $CO_2$ to form a second aqueous solution comprising dissolved $LiHCO_3$. Unreacted $CO_2$ and insoluble compounds are separated from the second aqueous solution using a gas-liquid-solid separator to produce a third aqueous solution. Dissolved impurities are removed from the third aqueous solution by contacting the third aqueous solution with an ion selective medium to produce a fourth aqueous solution. In a final step, $Li_2CO_3$ is precipitated from the fourth aqueous solution, wherein the precipitated $Li_2CO_3$ has a purity of at least about 99.99%.

In certain embodiments, the technical grade lithium hydroxide has a purity of not greater than about 99%. In alternate embodiments, the technical grade lithium hydroxide has a purity of not greater than about 99.9% purity. In certain embodiments, the insoluble compounds separated from the second aqueous solution are recycled to the first aqueous solution. In certain embodiments, the method includes the step of preheating the third aqueous solution to a temperature of about 50° C. before precipitating $Li_2CO_3$. In certain embodiments, the method includes the step of supplying the third aqueous solution to a reverse osmosis apparatus to concentrate the $Li_2CO_3$, wherein the reverse osmosis apparatus is operable to remove $CO_2$ from the solution and cause $Li_2CO_3$ to precipitate. In certain embodiments, the precipitated $Li_2CO_3$ has a purity of at least about 99.999%. In alternate embodiments, the precipitated $Li_2CO_3$ has a purity of at least about 99.9999%.

In another aspect, the present invention is directed to a method of producing high purity lithium carbonate. The method includes the steps of contacting an aqueous brine containing $LiHCO_3$ having a purity of less than about 99% with $CO_2$ at ambient temperature to form a second aqueous solution comprising $LiHCO_3$ and dissolved ions. The method includes the step of separating insoluble compounds from the second aqueous solution using a glass-liquid-solid reactor to form a third aqueous solution, the third aqueous solution comprising $LiHCO_3$ and dissolved ions. The method then includes the step of extracting at least a portion of the dissolved ions from said third aqueous solution with an ion selective medium to form a fourth aqueous solution containing the dissolved $LiHCO_3$ and having a reduced concentration of dissolved ions relative to the third aqueous solution. The method includes the step of maintaining a constant pressure while carrying out the separating and extracting steps. Finally, the method includes the step of heating the fourth aqueous solution to form solid $LiHCO_3$, gaseous $CO_2$ and dissolved impurities.

In certain embodiments, the insoluble compounds separated from the second aqueous solution are recycled to the first aqueous solution. In certain embodiments, the method includes the step of supplying the second aqueous solution to a reverse osmosis apparatus, wherein the reverse osmosis apparatus is configured to operate at high pressures, thereby concentrating the $Li_2CO_3$.

In another aspect, a method for producing high highly pure $LiPF_6$. The method includes the steps of reacting high purity $Li_2CO_3$ with HF to produce lithium fluoride solution, and then reacting the resulting solution with $PF_5$ to produce $LiPF_6$. In certain embodiments, the high purity lithium carbonate is produced according to methods described herein. In certain embodiments, the HF is dispersed in deionized water.

In another aspect, a method of producing highly pure LiF is provided. The method includes the step of reacting high purity lithium carbonate with HF gas in a fluidized bed reactor, wherein the LiF is highly pure and dry. In certain embodiments, the high purity lithium carbonate is produced according to methods described herein.

In another aspect, a method of producing highly pure $LiMnO_2$ is provided. The method includes the step of reacting high purity lithium carbonate with electrolytic $MnO_2$ to produce high purity $LiMnO_2$. In certain embodiments, the high purity lithium carbonate is produced according to methods described herein.

In another aspect, a method of producing highly pure lithium cobalt oxide is provided. The method includes the step of reacting high purity lithium carbonate with cobalt oxide to produce high purity lithium cobalt oxide. In certain embodiments, the high purity lithium carbonate is produced according to methods described herein.

In another aspect, a method of producing highly pure lithium iron phosphate is provided. The method includes the step of reacting high purity lithium carbonate with high purity ferric phosphate to produce highly pure lithium iron phosphate. In certain embodiments, the high purity lithium carbonate is produced according to methods described herein.

In another aspect, a method of producing highly pure $LiH_2PO_4$ is provided. The method includes the step of reacting high purity lithium carbonate with phosphoric acid to produce highly pure $LiH_2PO_4$. In certain embodiments, the high purity lithium carbonate is produced according to methods described herein. In certain embodiments, the method further includes reacting the $LiH_2PO_4$ with iron oxide to produce lithium iron phosphate.

In another aspect, a method of producing highly pure lithium chloride is provided. The method includes the steps of reacting a solution that includes deionized water and high purity lithium carbonate with gaseous hydrochloric acid to produce highly pure lithium chloride. In certain embodiments, the high purity lithium carbonate is produced according to methods described herein.

In another aspect, a method of producing highly pure lithium hydoxide is provided. The method includes the step of electrolyzing a solution comprising highly pure lithium bicarbonate. In certain embodiments, the high purity lithium carbonate is produced according to methods described herein.

In another aspect, a method for producing highly pure lithium carbonate is provided. The method includes the steps of feeding a first aqueous solution that includes a purified lithium chloride stream to an electrolyzer equipped with a membrane or a separator, wherein the first aqueous solution has a lithium chloride concentration of up to about 40% by weight to form a second aqueous solution comprising at least 10% by weight lithium chloride. The method includes the step of applying a current to the electrolyzer to produce a third aqueous solution in the cathode compartment that comprises greater than 4 wt % lithium hydroxide. Optionally, the method includes cooling the third aqueous solution and supplying the third aqueous solution and carbon dioxide to a carbonation reactor to produce a fourth aqueous solution comprising lithium bicarbonate. The fourth aqueous solution is separated from the carbon dioxide and lithium carbonate solids formed using a gas-liquid-solid reactor, and filtered to remove trace impurities. Finally, the method includes the step of feeding the filtered fourth aqueous solution to a precipitation reactor maintained at a temperature of at least about 95° C. to precipitate highly pure lithium carbonate.

In certain embodiments, the method includes the step of supplying the fourth aqueous solution following the filtration step to an ion exchange column to remove divalent ions.

In another aspect, a method of regenerating an ion exchange resin used in the production of lithium is provided. The method includes the steps of: displacing a first aqueous solution comprising lithium from the resin with water, wherein the water is supplied at a low flow rate; removing displaced solids from the resin using a counter-current flow of water; removing divalent ions by contacting the resin with dilute acid; washing the resin to displace and dilute the acid on the resin; reactivating the resin by contacting with dilute sodium hydroxide; and washing the resin with water.

BRIEF DESCRIPTION OF THE DRAWINGS

The characteristic novel features of the invention are set forth in the appended claims. So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. Note, however, that the drawings illustrate only an embodiment of the invention and are therefore not to be considered limiting of the invention's scope as it may apply to other equally effective embodiments.

DETAILED DESCRIPTION

Definitions

Figure 1:
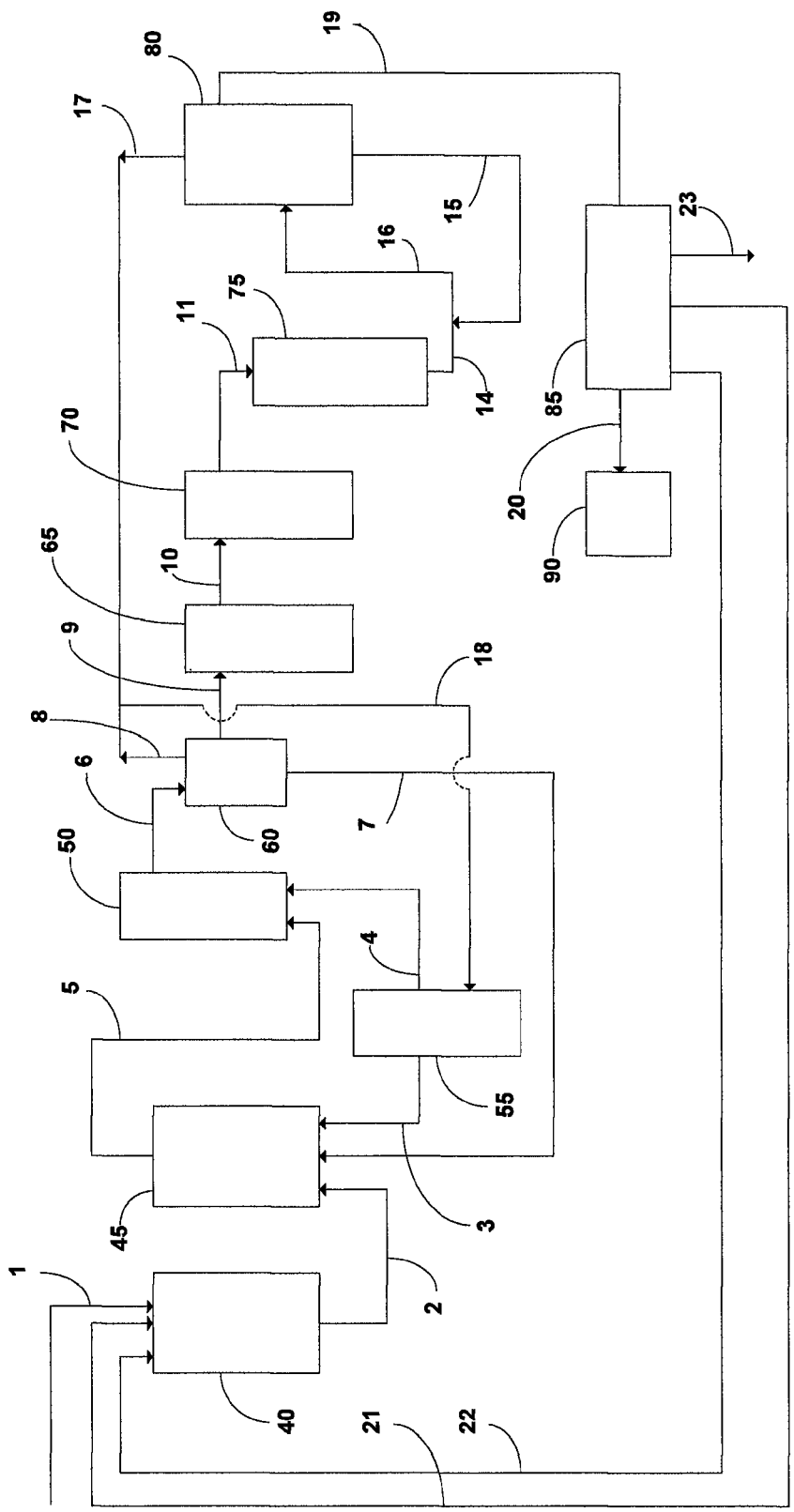
FIG. 1 is a schematic illustration of one embodiment of the present invention.

As used herein the following terms shall have the following meanings:

The term "high purity lithium" or "highly pure lithium" means lithium in excess of 99.9% purity.

The term "ultra high purity lithium" means lithium in excess of 99.999% purity.

As used herein, the term "a total lithium carbonate concentration" includes both dissolved lithium carbonate ($Li_2CO_3$) and lithium bicarbonate ($LiHCO_3$).

As used herein, the term "weak liquor" means the filtrate solution from the lithium carbonate recovery, which has a total lithium carbonate concentration between about 0.5 wt % and about 0.15 wt %, depending on operating mode (heating, cooling, and flow rate), operating conditions, and system design parameters.

As used herein, the term "strong liquor" means the solution from carbonation reactor having a typical total lithium carbonate concentration normally lying between about 4.0 and 5.0% by weight, typically about 4.4% by weight %, depending on operating mode (for example, heating, cooling, flow rate), operating conditions, and system design parameters.

Preparing High Purity Lithium Carbonate

Broadly described herein are methods of producing high purity lithium carbonate ($Li_2CO_3$). In a first embodiment, the process includes reacting an aqueous solution that include technical grade $Li_2CO_3$ (such as the $Li_2CO_3$ that can be purchased from a chemical supplier, for example, Chemetal, FMC, SQM, or other such suppliers) with carbon dioxide ($CO_2$) at temperatures above the freezing point of the solution, typically between about −5° C. and 45° C., more particularly around about room temperature, to produce an aqueous solution that includes lithium bicarbonate ($LiHCO_3$) and lithium carbonate ($Li_2CO_3$) dissolved therein. The step of contacting the lithium carbonate with carbon dioxide is preferably at as low a temperature as possible. In certain embodiments, the lowest temperature possible without using external energy to achieve an altered temperature is employed, for example at room temperature. Alternatively, a leachable ore solution that includes lithium may be treated with carbon dioxide at a temperature of between about −5° C. and 45° C., to similarly generate a solution that includes both lithium bicarbonate and lithium carbonate. Such lithium bicarbonate/lithium carbonate solutions may be used in the methods as described herein. This solution is often referred to as the strong solution, and can, for example, have a concentration of lithium compounds up to about 45 g/L, typically having a concentration of at least about 35 g/L at a temperature of about 45° C. The reaction can be conducted in a single reactor, but is preferably conducted in two agitated reactors arranged in sequence, or in series of reactors, optionally including a cooling system to maintain the reaction temperature at a temperature that is above the freezing point of the solution, preferably about 20° C. The mixture from the last of the reactors can be fed to a separation tank, where undissolved lithium carbonate, solid impurities, lithium bicarbonate containing solution, and carbon dioxide can be separated from each other. Stirred tank reactors may be used to prepare the mixture, but other gas-liquid-solid contacting reactors may also be used. The solid can be recycled preferably to the first or, optionally to a second carbonation reactor, if present, where the gases can be recovered and recycled back to the carbonation reactor. In embodiments wherein more than one carbonation reactor is employed, recovered carbon dioxide can be recycled to one or more carbonation reactors. The liquid stream can then be fed to a filtration system which can be configured to remove any insoluble impurities that may be present, such as, silica, iron, magnesium, calcium and like compounds. In certain embodiments, the filtration can utilize of a series of filters designed to progressively remove finer particles, such as for example, filters designed to remove particles having diameters of 10 μm, 1 μm, 0.2 μm, 0.3 μm, or in an alternate embodiment, a microfiltration system can be employed that is suitable to prevent colloidal iron (III) from contacting the ion exchange media in the subsequent step. Such a microfiltration system can be tangential (also known as flow by microfiltration) or perpendicular (also known as flow through microfiltration).

The filtration step is followed by the use of a divalent selective ion exchange resin, to adsorb soluble divalent or trivalent ions, such as magnesium, calcium, iron and the like, by selective ion exchange or other similar methods. Following the removal of the soluble divalent or trivalent ions by selective ion exchange, the temperature of the solution can then be raised or otherwise extracting or partially extracting the $CO_2$ to precipitate pure $Li_2CO_3$ in a second zone and preferably returning at least a part of the solution to the carbonation reaction zone (items 40, 45 and 50 in FIG. 1) for economic reasons. This can be done by, for example, by creating a vacuum and bubbling an inert gas, such as, nitrogen, air, argon, or the like, through the solution. Carbon dioxide can be recovered and recycled to the carbonation step. Undesirable monovalent cation impurities present remain in solution and approximately 85% of the solution can be recycled back to the lithium carbonate dispersion step at the beginning of the process and the unrecycled solution is recovered for use in the regeneration of the ion exchange media. During the filtration step of the process, lithium carbonate can be recovered by suitable methods, such as, rotary filtration, band filtration or the like. Recovered solid lithium carbonate can then be subjected to washing, such as, counter current washing, and can include separate filtration zones for the recovery of the filtrate (weak liquor) and the washing solutions. Approximately 15% of the washing solution can be removed and combined with the recycled lithium carbonate solution and supplied back to the initial dispersion step of lithium carbonate.

The ion exchange resin captures primarily divalent ions, such as, calcium and magnesium; however, other divalent ions that are present can also be captured by the ion exchange resin. The final step of filtration includes an iron (III) selective filtration system, which can prevent the iron (III) coming in contact with the ion exchange media. This is significant because if iron (III) is not removed prior to contacting the ion exchange resin and is captured by the ion exchange resin it is difficult to displace them from the ion exchange resins by standard methods of regeneration of ion exchange resins. Once the ion exchange resin capacity becomes exhausted, the solution can be switched to a second ion exchange column to continue filtration of the solution and capture of divalent ions.

Purity of Lithium Carbonate

In certain embodiments, the purity of the lithium carbonate can be controlled by ratio of the recycle to bleed of the weak liquor (i.e., the amount of the filtrate from the separation of lithium carbonate that is withdrawn). In certain embodiments, the weak liquor may have a lithium carbonate concentration of about 15 g/L. As the bleed ratio is varied between about 100% and 0%, the quantity of soluble monovalent cations and some anions build up in the recycle solution. Thus, at greater bleed rates, a higher the purity of lithium carbonate product can be obtained. For example, it has been found that at a bleed ratio of about 15%, 99.999% pure lithium carbonate can be obtained. Similarly, a bleed ratio of less than about 5% typically results in the production of lithium carbonate of about 99.9% purity, which is sufficient for electrochemical/battery grade production lithium carbonate. Furthermore, the degree of washing greatly influences the purity of the lithium carbonate product and its final purity. Different wash ratios to product through put can be used to produce different grades of product purity.

The operation of the ion exchange system is heavily influenced by the velocity of the strong solution through the ion exchange and by varying the velocity of the strong solution, lithium carbonate of varying purity can be obtained.

In certain embodiments, the lithium carbonate granulometry and morphology can be managed by increasing the degree of agitation and the residence time in the precipitation vessel. As used herein, granulometry generally refers to the particle size and morphology generally refers to the shape of the lithium carbonate compounds. In general, enough agitation is necessary to ensure that insoluble particles are suspended in solution, however excessive agitation can, in certain embodiments, result in a decrease in the average particle size. Increased agitation can be achieved by increasing the recirculation rates. Alternatively, it can also be increased by the addition of a mechanical agitator to the precipitation vessel. In certain embodiments, the residence time can be increased or decreased by either the volume of liquid contained in the vessel or by altering the flow rate. In certain embodiments, the vessel can have a fixed size; however the amount or rate of addition of liquid to the tank can be used to control the residence time of the liquids, thereby indirectly controlling the granulometry of the lithium carbonate particles, and to a lesser extent, the morphology of the lithium carbonate particles. Moreover, in certain embodiments, the morphology of the lithium carbonate can be modified by the addition of various metal ions to the mixture which provoke an altered crystal growth. In certain embodiments, the lithium carbonate particles can have an average diameter of less than about 100 µm, alternatively less than about 50 µm, alternatively less than about 10 µm.

The process described above does not remove phosphate or borate from the lithium carbonate product as both phosphates and borates typically precipitate with lithium carbonate. It is therefore envisaged that, in certain embodiments, phosphates and borates can be removed from the strong lithium bicarbonate liquor by passing the liquor through a phosphate adsorbing media such as alumina, or by utilizing a suitable ion exchange media such as AMBERLITE™ IRA743 or alternatively by solvent extraction.

The initial sulfate content in technical grade lithium carbonate obtained from brines is typically about 100 ppm. In certain embodiments, the sulfate concentration in high purity lithium carbonate can be reduced in a single pass to only 10 ppm, assuming a recycle ratio of weak liquor of about 85%. The sulfate concentration of the lithium carbonate can be further reduced by additional recycling of the lithium carbonate through the whole process. For example, in certain embodiments, a product lithium carbonate stream that has been twice cycled through the process described above twice can have a sulfate concentration of less than about 1 ppm.

In certain embodiments, an alternative approach reducing the sulfate concentration is to increase the bleed ratio to between about 50 and 100%, rather than the more optimum process of 10 to 35%.

Lithium Carbonate Filtration

The lithium carbonate can be filtered with a band filter at a temperature of between about 90° C. and 100° C., alternatively between about 92° C. to 95° C., onto a filter with a specially designed distributor. The filter cake can be washed in a counter current manner to ensure that the purest lithium carbonate is contacted with fresh deionized water. The wash water is recovered and can be used to wash lower purity lithium carbonate. This water can be used to wash the lithium carbonate multiple times to minimize dissolution of lithium carbonate in the water. The water recycle step can be particularly important if pure water is scarce. The final wash of the solid lithium carbonate is with hot deionized water, which can be supplied through one or more spray nozzles, at a temperature of between about 80° C. and 95° C., alternatively at a temperature of about 90° C. In certain embodiments it has been determined that washing the lithium carbonate product with water at temperatures of greater than about 95° C. results in the water turning to steam and washing is ineffective. In certain embodiments, the first wash is completed in a recycle mode, the wash water from the final wash is added to the wash water recycle system, thereby allowing for a much larger volume of water to be used, but not consumed. As a consequence of the recycling of the wash water, there is a bleed of the wash water, and a part of the wash water can be added to weak liquor recycle to the lithium carbonate dispersion vessel. In certain embodiments, the first wash water is contacted to the lithium carbonate solid at 50 to 90° C.

A Direct Route to Generate High Purity Lithium Carbonate

In one embodiment of the invention, a process for producing high purity lithium chloride from a lithium chloride solution containing up to about 1% by weight lithium is provided. In certain embodiments, the lithium chloride containing solution can be a geothermal brine or other brine solution, or other chloride containing solution. The first step of the process includes treating the lithium chloride solution to adjust the pH to between about 8 and 12, alternatively between about 10 and 12, alternatively between about 10 and 11 with a base, such as for example, lime, sodium hydroxide, ammonia, or the like,) to precipitate salts of calcium, manganese, or zinc. The solution is then optionally treated with a sodium carbonate solution or with a weak liquor obtained from the bleed of the weak liquor solution. The lithium chloride solution is then supplied to ion exchange media that is operable to remove traces amounts (typically on the order of parts per billion, or ppb) of divalent ions, and then to a secondary column that is operable to remove borate compounds that may be present. The lithium chloride is then concentrated by either evaporation or by a combination or reverse osmosis and thermal evaporation (including by natural evaporation from an evaporation pond), to produce a highly concentrated lithium chloride solution, having a lithium chloride solution of up to about 42% by weight lithium chloride (the exact concentration is temperature dependent). During the process, the sodium chloride concentration in the solution can be reduced from greater than 10,000 ppm to less than 1000 ppm.

The resulting lithium chloride solution, preferably having a lithium chloride concentration of less than 1000 ppm, can then be reacted at low temperatures with a gaseous mixture of ammonia and carbon dioxide to produce high purity lithium carbonate. The temperature of the solution can then be increased to degas the solution, thereby generating ammonia and hydrochloric acid gases. These gases are separated by known methods or by membranes.

In another embodiment, the present invention is directed to a method of producing high purity lithium compounds, wherein the method includes the following steps:

(1) feeding a purified lithium chloride stream having an approximate lithium chloride concentration of 40% by weight to an electrolyzer equipped with either a membrane or a separator to prevent migration of cations, such as sodium, lithium, and potassium, and anions, such as chloride, from migrating in the direction of the negative electrode;

(2) applying a current density of up to about 8,000 A/m$^2$ to the electrolyzer wherein chlorine is generated at the anode, and hydrogen is generated at the cathode, and a solution that includes lithium hydroxide is produced in the cathode compartment (wherein the lithium hydroxide solution has a concentration of about 4% by weight);

(3) cooling the lithium hydroxide solution and feeding the solution, along with carbon dioxide, to a carbonation reactor wherein the lithium hydroxide is converted directly to lithium bicarbonate;

(4) separating the lithium bicarbonate containing solution from the gas and/or any lithium carbonate solids formed;

(5) filtering the lithium bicarbonate solution to remove trace impurities, such as for example, iron, silica, magnesium, manganese, calcium and strontium;

(6) optionally, passing the solution through an ion exchange column to remove divalent ions that may be present; and (7) feeding the solution to a precipitation reactor where the solution is heated to a temperature of up to about 95° C. to precipitate highly pure lithium carbonate.

In certain embodiments, at least a portion of the filtrate solution can be recycled back to the cathode compartment of the electrolyzer.

Method of Preparing High Purity Chemicals for Batteries

With the high purity lithium carbonate obtained by any of the methods described above, high purity chemicals can be made by reacting this high purity lithium carbonate with specific chemicals. As stated previously, "high purity lithium carbonate" refers to any lithium carbonate having a purity of at least about 99.9%. Exemplary reactions include the following:

(1) reacting high purity lithium carbonate with HF to produce lithium fluoride solution, following by reaction with $PF_5$ to produce $LiPF_6$;
(2) reacting high purity lithium carbonate with HF gas in a fluidized bed reactor to produce highly pure and dry LiF;
(3) reacting high purity lithium carbonate with electrolytic $MnO_2$ to produce high purity $LiMnO_2$;
(4) reacting high purity lithium carbonate with cobalt oxide ($CoO_2$) to produce high purity lithium cobalt oxide;
(5) reacting high purity lithium carbonate with ferric phosphate to produce lithium iron phosphate;
(6) reacting high purity lithium carbonate with phosphoric acid to produce battery precursors, such as $LiH_2PO_4$, which can in turn be reacted with iron oxides to give lithium iron phosphate cathode powders;
(7) reacting high purity lithium carbonate dispersed in deionized water with gaseous hydrochloric acid to ultra high purity lithium chloride;
(8) a process to produce highly pure electrolyte salts: (a) triflate, (b) perchlorate, (c) $LiASF_5$, (d) $LiBF_3$, and any others, and (e) lithium bis(oxalate)borate;
(9) production of highly pure lithium hydroxide: (a) electrolysis of lithium bicarbonate solution, by dispersing high purity lithium carbonate in water and reacting it with carbon dioxide (b) the electrolysis of high purity lithium chloride solution produced by reacting high purity lithium carbonate and hydrochloric acid, and (c) the electrolysis of lithium sulfate produced from high purity lithium carbonate and sulfuric acid to produce highly pure lithium hydroxide solution.

In certain embodiments, the preparation of high purity lithium hydroxide include supplying a lithium halide to an electrochemical cell wherein the high purity lithium hydroxide is produced by electrolysis, while also producing chlorine and hydrogen gas.

In other embodiments, a lithium salt, for example lithium bicarbonate or lithium nitrate, is supplied to an electrochemical cell wherein it can be electrolyzed in water to produce high purity lithium hydroxide, hydrogen gas and either $H_2CO_3$ or $HNO_3$, respectively.

Alternatively, lithium sulfate can be supplied to an electrochemical cell and electrolyzed in water to produce high purity lithium hydroxide, $H_2SO_4$, and hydrogen gas.

In one embodiment, high purity lithium carbonate is reacted with HF to produce two moles of high purity lithium fluoride and carbon dioxide. The highly pure lithium fluoride is then reacted with $PF_5$ to produce a high purity $LiPF_6$ product.

In another embodiment, high purity lithium carbonate is reacted with 2 molar equivalents $HBF_4$ to produce 2 moles of high purity $LiBF_4$, as well as carbon dioxide and water.

In an alternate embodiment, high purity lithium carbonate is reacted with 2 molar equivalents of $CF_3SO_3H$ to produce two moles of high purity $Li(CF_3SO_3)$, as well as carbon dioxide and water.

In an alternate embodiment, high purity lithium carbonate is reacted with 2 molar equivalents of $HClO_4$ to produce two moles of $LiClO_4$, as well as carbon dioxide and water.

Regenerating the Ion Exchange Resin

In another aspect of the present invention, methods for the regeneration of the ion exchange resin are provided.

As used herein, the term "resin" refers to a polystyrene matrix cross linked with divinylbenzene (DVB) substituted with weakly acidic aminophosphonic or immido acetic acid active groups known by various trade names, such as, Amberlite® IRC-746/747/748, Purolite® S 930, Purolite® S 940, Purolite® S 950, LEWATIT® TP-260, IONAC® SR-5, and the like.

Figure 4:
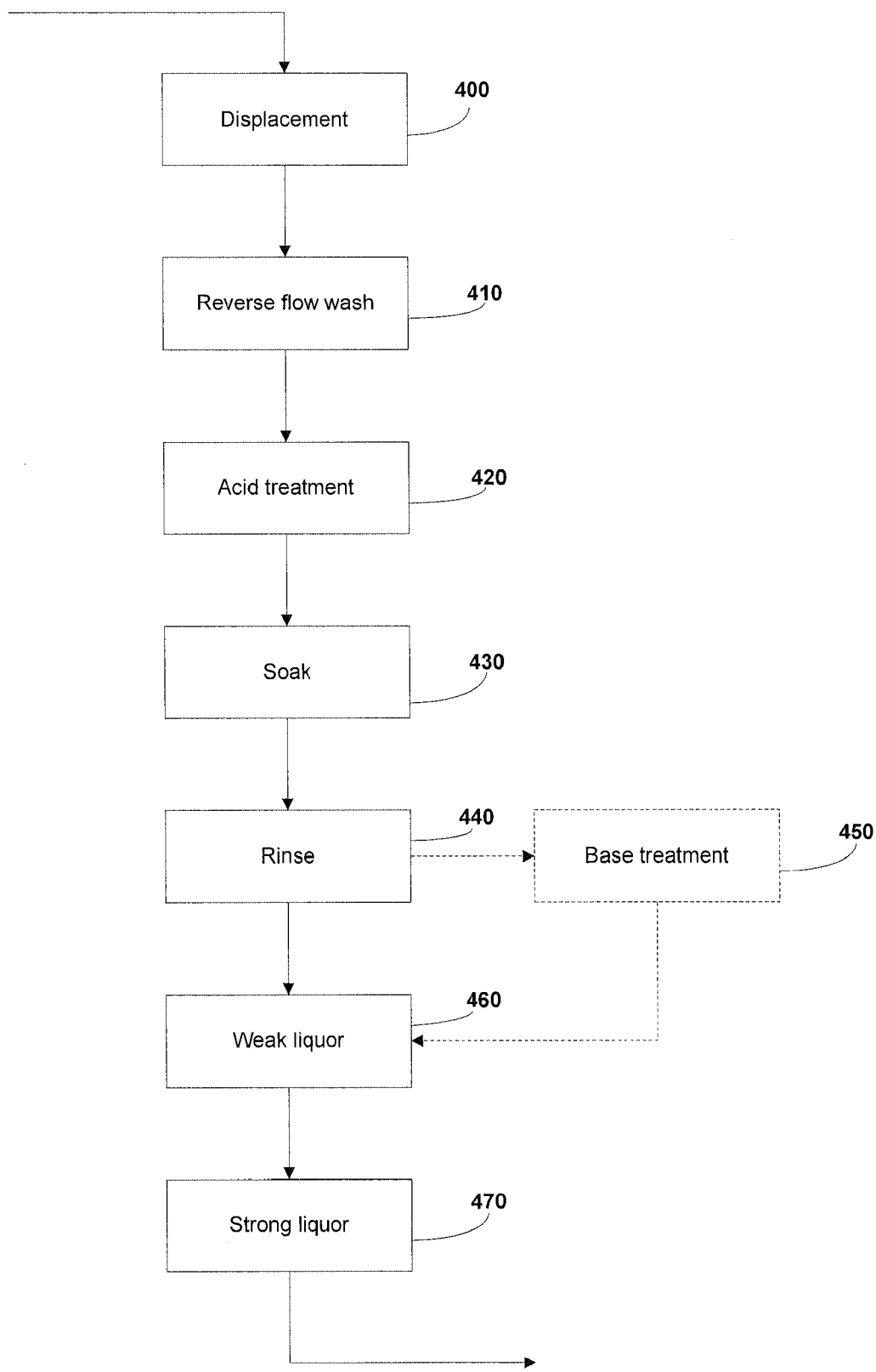
FIG. 4 is a schematic illustration a method for resin regeneration.

One embodiment 400 of the ion exchange regeneration method, as shown in FIG. 4, is as follows:

(1) displacing the strong solution from the resin in step 400 by contacting with deionized water at a low flow rate to prevent mixing;
(2) optionally removing solids and any broken resin (these are recovered by filtration at the exit of the column) by running a resin fluidizing backwash of water (i.e., approximately 1.5 bed-volumes in a reverse flow);
(3) removing divalent ions from the resin by treating with acid in step 420, for example, by adding dilute hydrochloric acid (i.e., a concentration of less than 10%);
(4) soaking the column with acid in step 430 for a period of about 30 minutes;
(5) rinsing the resin in step 440 with deionized until a pH of 5 is reached to displace and dilute the acid from the column;
(6) optionally, treating the column with base to reactivate the resin in step 450 by adding dilute NaOH to the column;
(7) rinsing the resin with weak liquor to displace and dilute NaOH from the column;
(8) the feed can be returned to loading with the strong liquor solution in a downflow manner;
(9) combining the rinse solutions and recycling the solutions through reverse osmosis for reuse; and
(10) optionally, the wash solutions from steps (3) and (5) can be recycled.

In an alternate embodiment of the invention, a method is provided as follows:

(1) displacing the strong solution from the resin by adding deionized water at a low flow rate;
(2) optionally, removing displaced solids and any broken resin from the resin by running a backwash;
(3) treating the column with acid to remove divalent ions by adding dilute hydrochloric acid (e.g., HCl having a concentration of less than about 10%);
(4) washing the resin until a pH of about 5 is reached to displace and dilute the acid on the column;
(5) regenerating the ion exchange media by contacting with the bleed of weak liquor (having a concentration of up to about 14 g/L of lithium carbonate and lithium bicarbonate);
(6) rinsing the resin with deionized water to displace and dilute the column;
(7) optionally, the rinse solutions can be combined and recycled through reverse osmosis for reuse; and
(8) optionally, the solutions from steps (3) and (5) can be recycled.

Microfilter Recycling

Microfilters are expensive and frequently become blocked with impurities. It is therefore necessary to recycle them. Several methods of filter recycling have been developed: the preferred methods of recycling are to use citric acid to dissolve iron which allows the iron selective filter to be recycled. Other compounds may also be used to achieve this same result, such as sodium EDTA. It is, however, more effective to use a strong acid solution, such as nitric acid (having a concentration of about 1 to 10% solutions) to recycle the filter. To prevent contamination, the filters are then thoroughly rinsed before being placed back into service.

EXAMPLES

Example No. 1

Production of Lithium Carbonate

Figure 2:
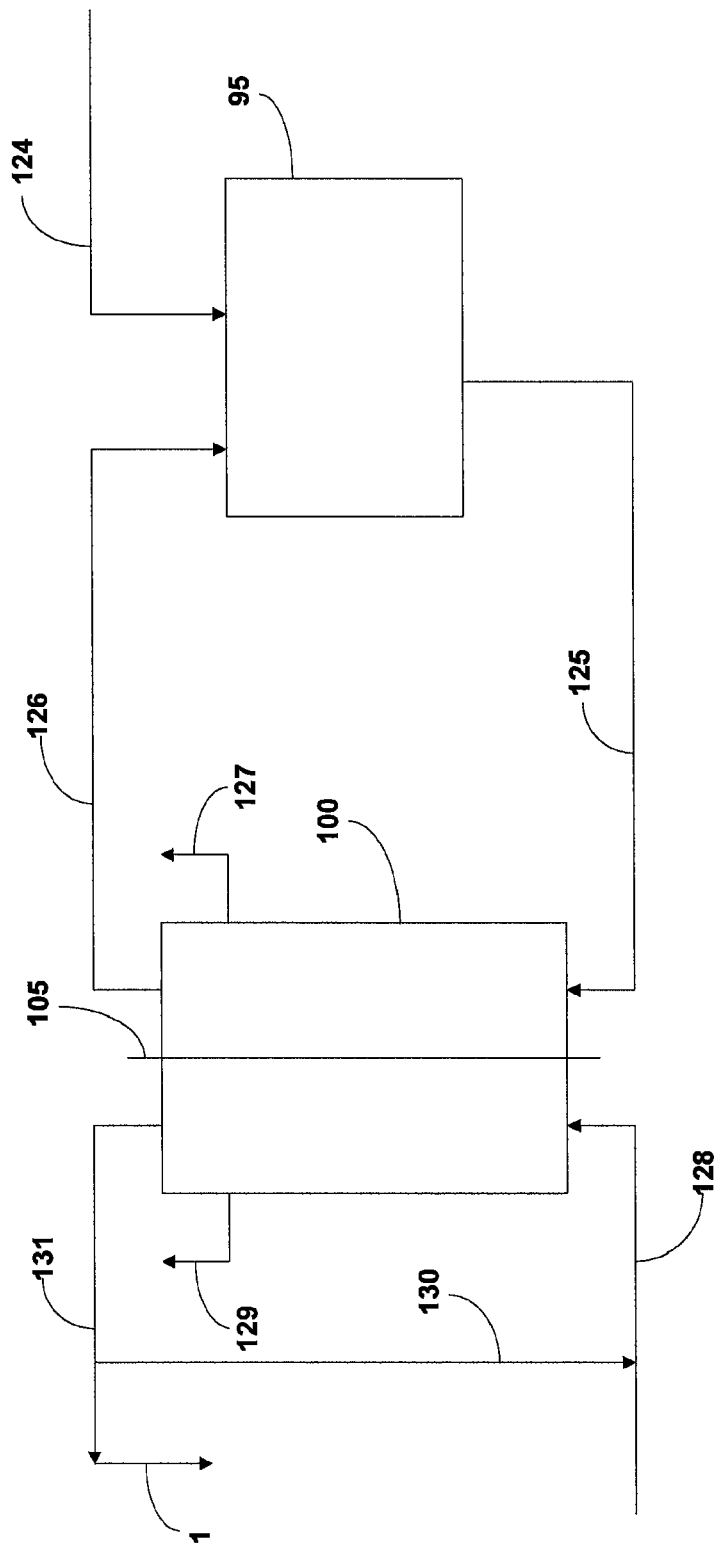
FIG. 2 is a schematic illustration of one embodiment of the present invention.

Referring now to FIG. 1 and FIG. 2, 40 is the dispersion; 45 is the first reactor, 50 is the second reactor, 55 is the $CO_2$ tank, 60 is the gas/solid/liquid separation tank(degasser), 65 is the filter bags, 70 is the filter cartridges, 75 is the resin columns, 80 is the precipitator, 85 is the felt filter, 90 is the dryer, 1 is the impure carbonate stream, 2 is the first reactor feed stream, 3 is the first carbonation reactor, 4 is the second carbonation reactor, 5 is the second reactor feed stream, 6 is the transfer stream to decanter, 7 is the carbonate return stream to first reactor, 8 is the first carbon dioxide recycle, 9 is the bicarbonate stream which is supplied to coarse filtration filter bags (such as the liquid filtration bags provided by Eaton-GAF), 10 is the bicarbonate stream which is supplied to fine filtration cartridge filters (such as the sterilizing-grade Aervent cartridge filters available from Millipore), 11 is the bicarbonate stream which is supplied to the resin, 14 is the bicarbonate to precipitator, 15 is the exchanger recirculation stream, 16 is a mixed stream that includes the recirculation stream plus bicarbonate stream which is supplied to the precipitator, 17 is the $CO_2$ evaporation stream, 18 is the $CO_2$ return line to tank 55, 19 is the carbonate stream (which can include carbonate, bicarbonate or a combination thereof) supplied to filter, 20 is the carbonate stream that is supplied to dryer, 21 is the weak liquor which is recycled to the dispersion, 22 is the recycle wash water to that is recycled to the dispersion, and 23 is the wash water bleed.

Referring now to FIG. 2, 95 is a mix tank where recycle stream 126 is mixed with feed stream 124, 100 is an electrolyzer that includes a division 105 between cathode and anode compartments, which can be achieved with a membrane or diaphragm, 125 is the lithium chloride solution, 126 is the lithium chloride solution which is the effluent of the electrolyzer, 127 is the chlorine gas feed, 128 is the water feed, 129 is the hydrogen gas feed, 130 is the lithium hydroxide recycle stream, and 131 is the electrolysis lithium hydroxide product stream.

The processes shown in FIG. 1 and in FIG. 2 are as follows:

The process starts in dispersion tank 40, which can include 3 inputs. Approximately 85% of the feed enters via line 21 as a weak liquor, which can be cooled via known means, such as a heat exchanger, to the desired temperature. Feed line 21 can have a lithium carbonate/bicarbonate concentration of about 15 g/L. The mass flow rate of line 21 into tank 40 is about 1428 kg/hr. Approximately 15% of the feed is supplied to tank 40 via line 22 as recycled wash water, which can be cooled to the desired temperature by known means. This solution in line 22 can have a lithium carbonate/bicarbonate concentration of about 7 g/L and can be supplied at a mass flow rate of about 252 kg/hr. Raw lithium carbonate can be supplied via screw feeder 1 at a rate of about 30 g/L, and a mass flow rate of about 1680 kg/hr, under normal operating conditions. The three inputs to tank 40 are mixed with sufficient agitation to maintain the insoluble lithium carbonate as a uniformly dispersed solid throughout the tank. An exemplary residence time is 11 minutes. The solution is then pumped from tank 40 via line 2 into the first reactor 45, where $CO_2$ gas is supplied via line 3 and is transformed to lithium bicarbonate and therefore render the lithium soluble.

Figure 3:
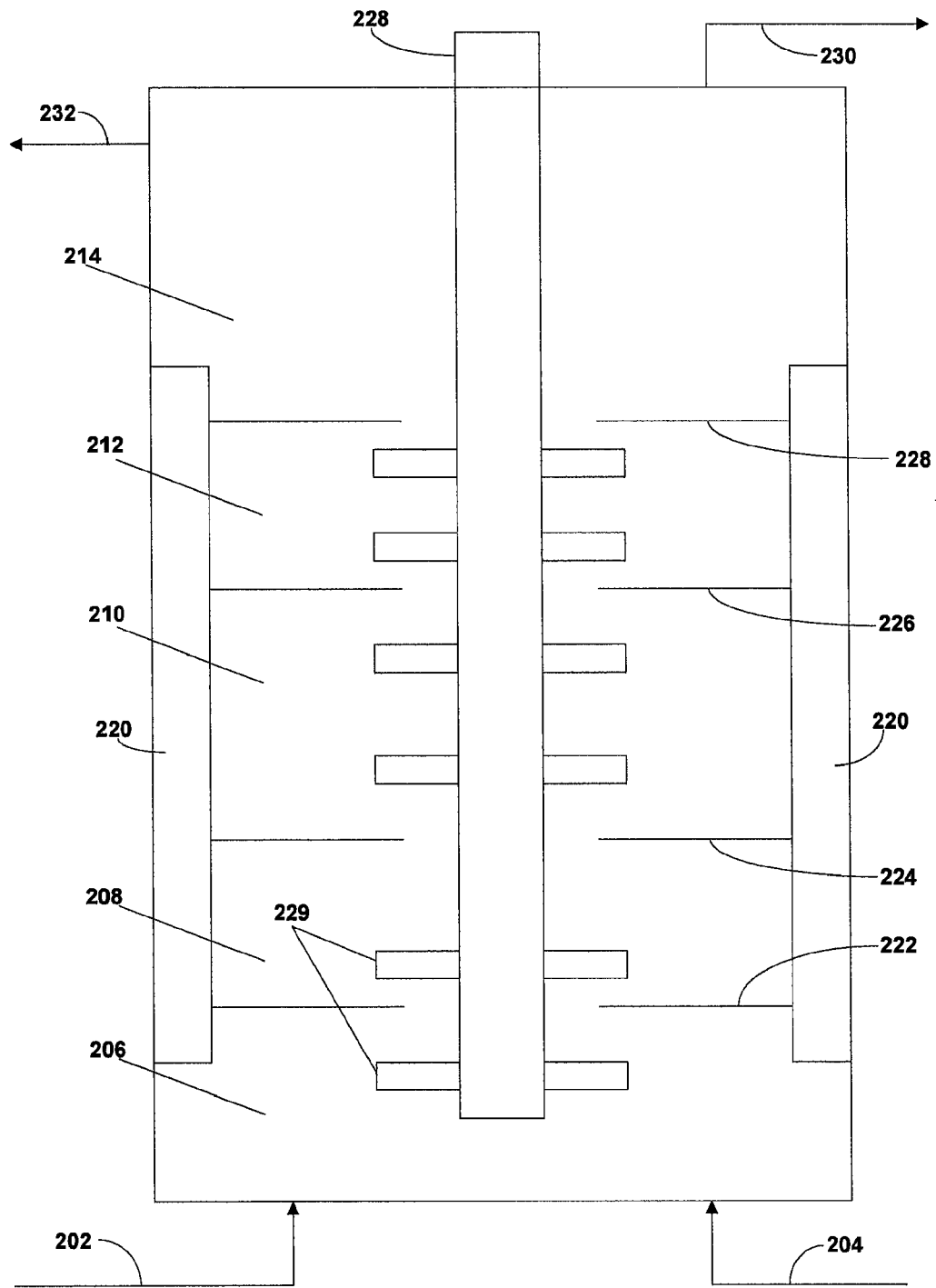
FIG. 3 is a cross-section of an exemplary reactor for the production of lithium bicarbonate.

Referring to FIG. 3, an exemplary reactor 200, which can be similar to or the same as first and second reactors 45 and 50, where such a transformation to lithium bicarbonate may be generated is provided. In certain embodiments, the lithium carbonate solution is supplied to reactor 200 via line 202 and the carbon dioxide gas is supplied the reactor via line 204. Reactor 200 can be separated into various sections, for example a first section 206, a second section 208, a third section 210, a fourth section 212, and a fifth section 214. Reactor 200 can include various plates separating the various sections, such as plate 222, separating the first and second sections, plate 224, separating the second and third sections, plate 226, separating the third and fourth sections, and plate 228, separating the fourth and fifth sections. Reactor 200 can also include an agitator 228, positioned within the reaction vessel, such that the agitator is capable of providing sufficient mixing of the lithium carbonate and carbon dioxide. Agitator 228 can include various blades or protrusions 229 designed to provide thorough mixing. Reactor 200 can also include baffles 220. Excess carbon dioxide exits reactor 200 via line 230 and the solution can be removed via 232.

The flow rate of the carbon dioxide to the reactor can be at least about 200 L/min, alternatively at least about 250 L/min. Generally, at least a molar equivalent of carbon dioxide is provided, more preferably slightly greater than a molar equivalent (i.e., at least about 1.05 molar) is provided, alternatively greater than about 1.1 molar equivalent is provided. Solid lithium carbonate can be recycled from the bottom of the degasser 60 via pump 7 to the bottom of reactor 45. During this stage of the reaction, the temperature can increase by about 5° C., due in part to the exothermic chemical reaction that takes place. The solution from the first reactor 45 can then be fed via line 5, optionally through a heater exchanger, to the second reactor 50 at a flow rate of between about 1600 kg/hr and about 1700 kg/hr. In certain embodiments, the flow rate is at least about 1500 kg/hr. A heat exchanger can be used to cool down the fluid to a temperature of about room temperature. Line 4 supplies a $CO_2$ to second reactor 45 at a flow rate of at least about 100 L/min, alternatively at least about 120 L/min, alternatively about 135 L/min. In certain embodiments, this occurs at a pressure that is slightly above atmospheric pressure, but it can also be run with greater through put at increased pressure. The operating volumes of the first and second reactors can be about 500 liters each, although reactors having different operating volumes may also be used. The solution can be cooled to a temperature of about 20° C. and supplied to second reactor 50 via pump 5. The heat of the reaction occurring in second reactor 50 increases the temperature by about 1 to 2° C. Line 4 supplies $CO_2$ gas to reactor 50 at a flow rate of about 135 L/min flow. Second reactor 50 can be a stage reactor similar to the first reactor 45. The temperature in reactor 50 may increase by about 1° C. as a result of the chemical reaction. Operating second reactor 50 at a temperature below about 20° C. enables the addition of a higher solubility of lithium carbonate into the solution, which in turn can lead to greater productivity (i.e., greater through put and higher yield). The bicarbonate containing solution is transferred via 6 from second reactor 45 to degasser tank 60.

In degasser tank 60, the gases, solids and liquid are separated. Solids can be pumped as a slurry via line 7 to first reactor 45. Gases, which can include $CO_2$, can be separated and supplied via line 8, which can recycle the gas to $CO_2$ tank 55, and resupplied to either first or second reactor 45 or 50. The liquid bicarbonate is pumped via line 9 through at least one, and preferably two, mechanical filter 65. The mechanical filter can include multiple individual filters of varying sizes, including a first filter comprising a 10 μm filter bag, a second filter comprising a 1 μm filter bag. The filtered lithium bicarbonate solution can be supplied to second mechanical filter 70, which can include one or more filter cartridge, for example a first cartridge comprising a 0.2 μm filter and a second cartridge comprising a 0.3 μm cartridge. The second cartridge can be configured to prevent iron being fed to ion exchange system 70. The cartridge regeneration process is discussed below. The lithium bicarbonate containing liquid solution can be pumped via line 11 to ion exchange resin column 70. The ion exchange resin can remove soluble metal divalent ions that pass through the filter bags 65 and the filter cartridges 70. In certain embodiments, the ion exchange 75 can include two columns, one column that is in operation and a second column that is being regenerated. The ion exchange columns can be switched between operation and regeneration when the operating media becomes saturated. The filtered solution from the ion exchange system is fed via line 14 to precipitator 80. Precipitator 80 can optionally be heated by a recirculation system, which can include a heat exchanger. The solution from precipitator 80 can be fed from bottom of the tank and is pumped via line 15 to return line 16. The solution from the ion exchange column 75 can be combined in line 16 with the heated solution from line 15 and supplied to the precipitator 80. Precipitator 80 can be agitated by the flow of line 16. Optionally, precipitator 80 can include an agitator. The solution in precipitator 80 can be maintained at a temperature of about 95° C., which facilitates the separation of $CO_2$ from the bicarbonate. The solid carbonate exits precipitator 80 by overflow and $CO_2$ can be cooled and recovered via line 17. Carbon dioxide gas can be recycled via line 18 to the two reactors, 45 or 50. A product stream that includes about 90% lithium carbonate by weight can be pumped via line 19 to filter band 85. The weak liquor can be recovered in a vacuum pan system, and can be cooled and pumped via line 21 to dispersion tank 40. A part of this liquor can be stored for regeneration of the resin. The first wash can be done with the same wash recycle water. The second wash can be done with deionized water at a temperature of about 92° C. Water from each wash can be combined in the same tank for reuse. This water can be cooled and pumped to dispersion tank 40. There is a bleed line 23 of this water.

Referring to FIG. 2, lithium chloride feed stream 124, having a concentration of between about 10 and 40%, can be supplied to tank 95, The lithium chloride can be sourced from an extraction process, including geothermal or other brines. Lithium chloride from tank 95 can be supplied via line 125 to electrolyzer 100. The effluent lithium chloride solution electrolyzer 100 can be recycled back to tank 95 via line 126, while chlorine gas and hydrogen gas exits the electrolyzer through outlets 127 and 129, respectively. Water is supplied to electrolyzer 100 via line 128. Lithium hydroxide can be recycled via line 130 to electrolyzer 100, lithium hydroxide product stream 131 can be collected. In electrolyzer 100, lithium ions migrate from the anode compartment to the cathode compartment by way of migration and diffusion forces.

Example No. 2

Loading the Resin to the Column

Resin is loaded into the column, as follows. First, in a 208 L barrel, Purolite® S 940 resin is mixed with deionized water. To a column having a volume of about 1,060 L was added about a ½ volume of deionized water. Using a funnel, the resin and deionized water are manually added to the column. As needed, the valve at the bottom of the column is opened to empty a little water. The steps are repeated until approximately 440 L of resin has been introduced to the column.

Example No. 3

Resin Regeneration

In one embodiment of the present invention, a method for the regeneration of the ion exchange resin is provided, as follows:
(1) strong liquor is removed from the displacement solution and placed in a holding tank; the strong liquor is replaced with about 1 bed volume of deionized water that is pumped into the top of the column at a rate of about 2 to 4 bed-volumes/hour;
(2) the resin is unpacked with deionized water and the column is filled from the bottom of the column with about 1.5 bed volumes of water at a rate 1.2 bed-volumes/hour;
(3) the pH of the solution in the column is lowered to force resin balls to release retained metal elements and the column filled with 2 bed volumes of an HCl solution having a concentration of between about 1-8%, preferably 4%, at a rate of about 2.4 bed-volumes/hour
(4) the acid it is left in place for about 30 minutes;
(5) steps (3) and (4) are repeated;
(6) the column is rinsed with about 2.1 bed volumes of deionized water at a rate of about 2.4 bed volumes/hr until the pH of the column nears neutral pH
(7) the column is rinsed with about 2.4 bed volumes of a caustic soda solution having a concentration of between about 2 and 4% at a rate of about 2.4 bed volumes/hr to convert the resin back to the active form to enable the capture multivalent ions
(9) about 2.4 bed volumes of weak liquor $LiHCO_3$ is circulated at a rate of about 2.4 bed volumes/hr through the column to replace $Na^+$ ions with $Li^+$
(10) the strong liquor that was temporarily transferred to a holding tank during the displacement step is returned to the column at a rate of about 1.2 bed-volumes/hour Example No. 4

Figure 5:
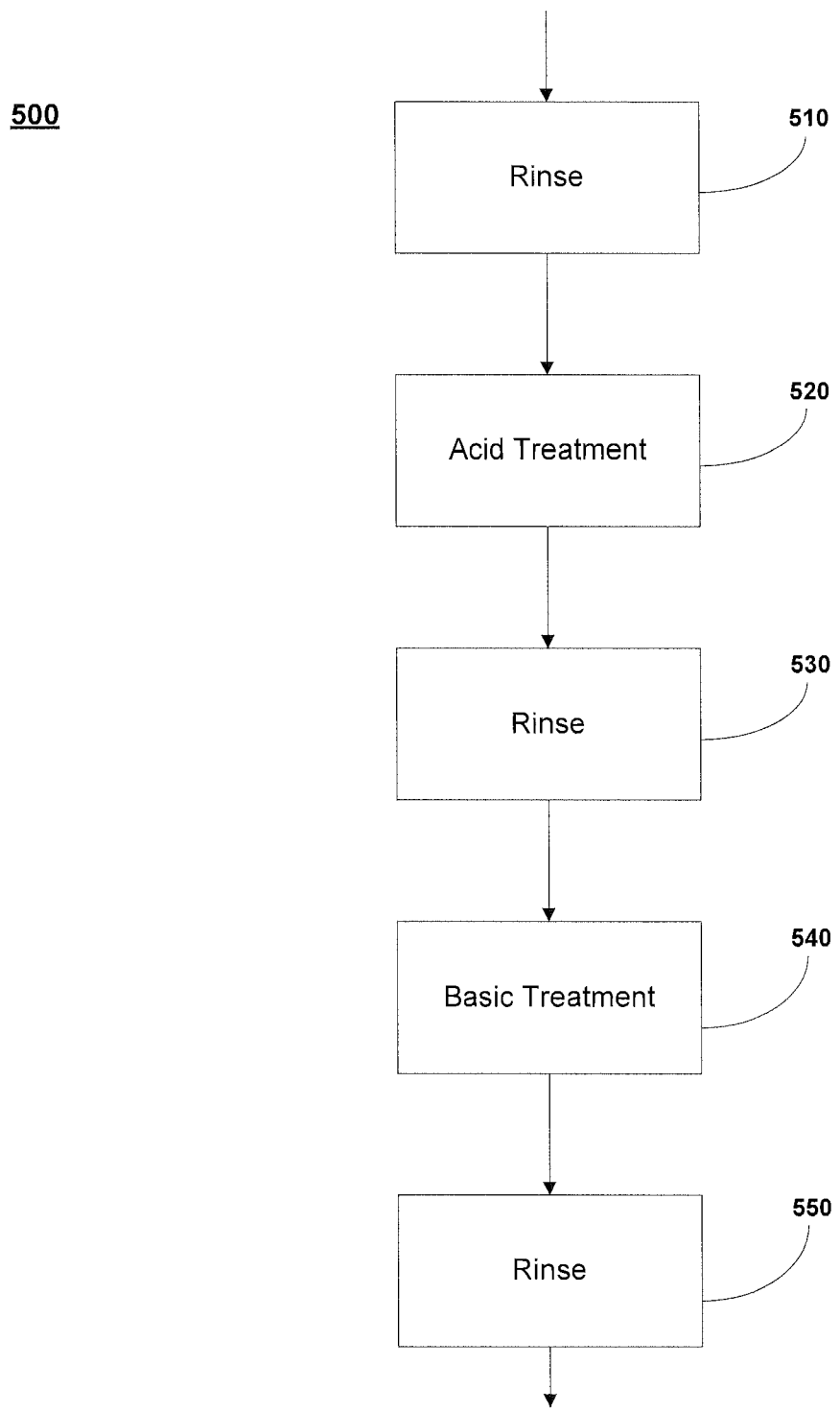
FIG. 5 is a schematic illustration of a method of regenerating the cartridge.

Cartridge filters are very expensive and should be used only once before replacement as the plastic around the filter and the cartridges' connections are fragile. In another aspect of the present invention, a method for the in situ regeneration of cartridges is provided. All the steps will be done in reverse flow. Referring to FIG. 5, the method 500 is shown.
(1) in first rinsing step 510, about 200 L of deionized water is circulated through the microfiltration cartridges having dimensions, for example, of about 2 in. by 40 in., to removing solid particles;
(2) in acid treatment step 520, approximately 5 L of a 20% solution of $HNO_3$ is added to about 200 L of deionized water and is circulated through the cartridges;

(3) in second rinsing step 530, about 200 L deionized water is circulated through the cartridges to remove acid;

(4) in a base treatment step 540, about 290 ml of a 50% solution of a strong base, such as sodium hydroxide or the weak liquor, is added to about 200 L of deionized water and is pumped through the cartridges; and (5) in third rinsing step 550, about 200 L of deionized water is recirculated through the cartridges to removing caustic soda.

In another embodiment of the present invention, a process for making high purity lithium carbonate without first converting the lithium chloride into solid lithium carbonate is provided as follows:

(1) a purified lithium chloride stream of approximate lithium chloride concentration of 40 wt % is supplied to an electrolyzer equipped with either a membrane or a separator;

(2) a current is applied to the electrolyzer and chlorine generated at the anode, hydrogen generated at the cathode and a solution of greater than 4% by weight lithium hydroxide produced in the cathode compartment;

(3) the lithium hydroxide solution is cooled and fed, along with carbon dioxide, to a carbonation reactor where it is converted directly to lithium bicarbonate;

(4) the solution is separated from the gas and any lithium carbonate solids formed;

(5) the lithium bicarbonate solution is filtered to remove trace impurities including, such as, iron, silica and other impurities;

(6) optionally, the solution is passed through an ion exchange column to remove divalent ions;

(7) the solution is fed to a precipitation reactor and heated to a temperature of about 95° C. to precipitate highly pure lithium carbonate; and (8) the solution is recycled back to the cathode compartment for the electrolyzer.

Example No. 5

Effect of Current

Test #1: The test conditions are shown in Table 1 below.

TABLE 1

| Parameters | Median Values |
| --- | --- |
| Current | 76.8 A |
| Density of current | 6,000 A/m$^2$ |
| Voltage | 5.5 V |
| Flow Rate | 210 l/h (0.14 m/s) |
| Test Duration | 100 minutes |
| Temperature | 50-55° C. |
| LiOH (initial) | 3.5 M |
| H$_2$SO$_4$ (initial) | 0.11 M |
| Li$_2$SO$_4$ (initial) | 2.3 M |

Nafion 350 membranes were conditioned with a solution of 2% LiOH. The output was calculated by three different manners: LiOH by titration of the catholyte, H$_2$SO$_4$ by titration of the anolyte, and Li$_2$SO$_4$ by either analysis with ion coupled plasma atomic emission spectroscopy or ion coupled plasma mass spectroscopy of the anolyte. The current efficiencies were measured by the measurement of three concentrations of lithium hydroxide, sulfuric acid, and lithium sulfate at, respectively, 59%; 61%; and 61%. The average current efficiency was 60%.

Test #2: Current density was lowered to 4000 A/m$^2$ (51.2 A), the duration was increased to 135 minutes to allow for a total load of more than 400,000 coulombs, as in Test #1 above. The current efficiencies obtained were: LiOH=71%, H$_2$SO$_4$=59%, and Li$_2$SO$_4$=55%, with an average of 62%.

Test #3: The current density was fixed at 3000 A/m$^2$ (38.4 A) and the duration at 180 minutes. The current efficiencies were: LiOH=53%, H$_2$SO$_4$=62%, and Li$_2$SO$_4$=67%, with an average of 62%.

Test #4: The current density was fixed at 3500 A/m$^2$ (44.8 A) and the duration at 154 minutes. The current efficiencies were: LiOH=59%, H$_2$SO$_4$=62%, and Li$_2$SO$_4$=74%, with an average of 62%.

Example No. 6

Figure 10:
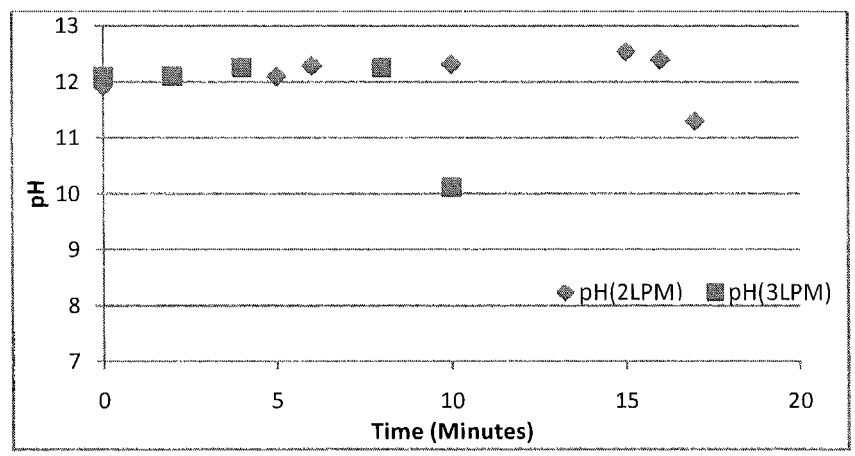
FIG. 10 is a graph illustrating the pH of the LiOH solution more or less remains constant until the entire lithium hydroxide gets converted into lithium carbonate. The sudden drop in pH is associated with the formation of lithium bicarbonate and completion of carbonation reaction.

The objective of the electrolysis process is to convert purified, concentrated LiCl into a concentrated LiOH solution for conversion to lithium bicarbonate, before passing the lithium bicarbonate solution through the process steps described in FIG. 10 at the gas-liquid-solid separation step, and through the process steps described in FIG. 10 to produce lithium carbonate. The limiting factor determining the efficiency of the cell is the concentration of lithium hydroxide in the catholyte, due to back-migration of the hydroxide across the membrane. The experimental program was designed to operate the cell at four different hydroxide concentrations to map its effect and determine the maximum concentrations that could be prepared.

The experiment measured current efficiency and energy utilization of the dialysis process as a function of hydroxide concentration. As described in the chemistry section above, Li$^+$ ions migrate from the anolyte to catholyte under the applied electric field, while water is electrolyzed to H$_2$ and OH$^-$ at the cathode. In theory, each electron passed in the external circuit corresponds to an increase of one LiOH molecule in the catholyte, leading to an increase in concentration of LiOH over time. However, the main inefficiency of the process, back migration of OH$^-$ ions from catholyte to anolyte, is dependent on the OH$^-$ concentration of the catholyte. The experiments reported here were performed with the intention of maintaining the OH$^-$ concentration of the catholyte constant by adding water at a known rate. The efficiency of the reaction was measured by comparing the actual rate of addition of water addition with that expected on the basis of theory.

Experimental Set-Up

The electrolysis system consisted of the electrolysis cell, and the anolyte and catholyte flow systems. Electrolysis of LiCl solutions was carried out using an FM01 electrolyzer manufactured by ICI (a scale model of the FM21 electrolyzer used commercially in the chlor-alkali industry). The electrolyzer included lantern blade-style electrodes; ruthenium oxide coated titanium was used as anode and nickel was used as cathode. Nafion® 982 was used as the membrane. The active surface area was 64 cm$^2$ (4×16 cm), and the cell gap was about 12-13 mm. The FM01 electrolyzer was operated with the flow direction parallel to the 16 cm direction, as this improved the management of gasses (chlorine and hydrogen) evolved from the electrodes. In addition, although anolyte and catholyte flows are normally fed from opposite sides of the cell, they were fed from the same side in these tests, again to limit the effects of gas blinding.

The anolyte flow system included a feed tank, pump, degassing tank, chlorine scrubber, and collection tank. A lithium chloride solution having a concentration of about 21% by weight was placed in the anolyte feed tank and heated to about 90° C. The solution was pumped through the anode chamber of the cell in a single pass mode at a flow rate of about 20 cm³/min, corresponding to a face velocity of 0.13 cm/s. On exiting the cell, the LiCl solution and entrained $Cl_2$ gas (produced at the anode) were passed through into a degassing tank which was equipped with a chlorine scrubber to remove chlorine. The solution was then pumped into a collection tank for storage.

The catholyte flow system included a tank, pump and water feed system. Lithium hydroxide was placed in the tank and heated to about 95° C. and was fed to the cathode chamber of the cell in recirculating mode at a flow rate of about 50 mL/min, corresponding to a face velocity of 0.33 cm/s. Water was added continuously to the system using a peristaltic pump to try to maintain a constant LiOH concentration. The rate of addition was monitored by the weight loss of the water tank. Nitrogen was bubbled through the catholyte recirculation tank to minimize reaction of LiOH with $CO_2$ from air.

The experimental conditions used in the four experiments are summarized in Table 2 below. These conditions were the same for all of the experiments. The concentration of hydroxide in the, catholyte was varied from 2.5 M to 0.7 M between the four experiments.

TABLE 2

Summary of main parameters used in the electrolysis experiments performed.

| Parameter | Value |
|---|---|
| Current Density | 3000 A m⁻² |
| Electrode Area | 64 cm² |
| Anolyte Volume | 60 cm³ |
| Catholyte Volume | 60 cm³ |
| LiCl Inlet Concentration | 21 wt % |
| LiCl inlet pH | 0.5-0.7 |
| Temperature | 90° C. |
| Time of Operation | 2-3 hours |
| Anolyte (LiCl) Flow Velocity | 0.13 cm/s |
| Catholyte (LiOH) Flow Velocity | 0.33 cm/s |

Samples were collected at the catholyte inlet and outlet and anolyte outlet ports every 30 minutes during operation of the cell. The cell voltage was monitored at the cell terminals using a handheld multimeter. The difference between the inlet and outlet catholyte hydroxide concentrations and the cell voltage were used to calculate the efficiency and energy consumption of the cell.

Results

Figure 6:
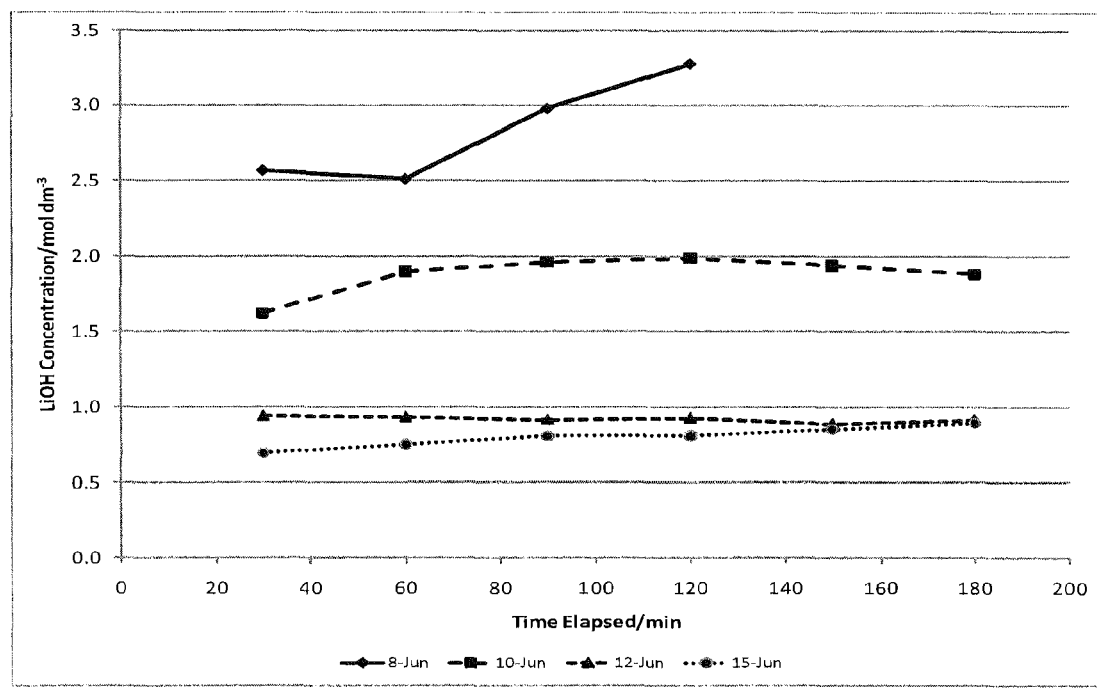
FIG. 6 is a graph showing the variation in lithium hydroxide concentration during four experimental runs.
Figure 7:
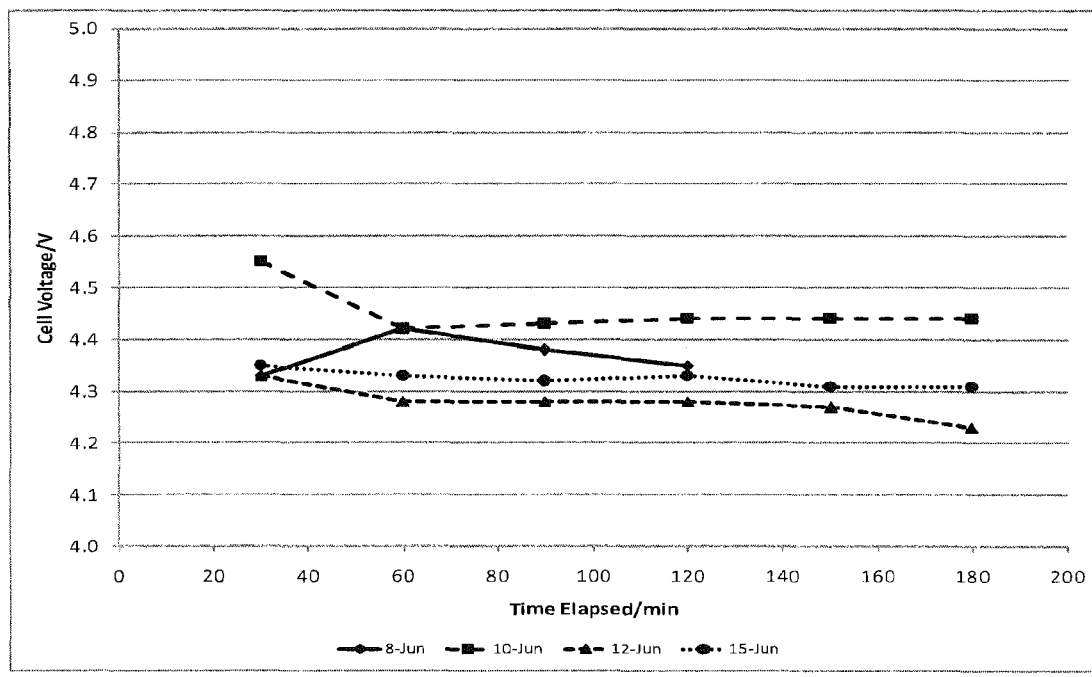
FIG. 7 is graph showing cell voltage during operation of electrolysis cell to convert LiCl to LiOH.

Referring now to FIG. 6 to FIG. 9 and Table 3, the results of the four experiments are summarized. FIG. 6 shows the difficulty in maintaining a constant LiOH concentration based solely by adjusting the rate of water addition, in the absence of a real-time measurement of the hydroxide concentration. This is believed to be because water can be consumed or added to the catholyte by a variety of mechanisms, including electrolysis, evaporation and migration across the membrane with $Li^+$ cations. In general, the data suggest that the higher the initial concentration of LiOH, the more difficult the task of maintaining the concentration constant through water addition.

The cell voltage was approximately 4.3-4.4 V for all of the experimental runs (shown in FIG. 7), indicating that the voltage is relatively independent of hydroxide concentration. It also implies that energy consumption is largely driven by the electrical efficiency of the electrode and membrane reactions. The cell gap in the FM01 electrolyzer used in the study (12-13 mm) is large, as compared to commercial cells (2-3 mm), so a commercial cell would be expected to have a lower cell voltage than those measured here.

Figure 8:
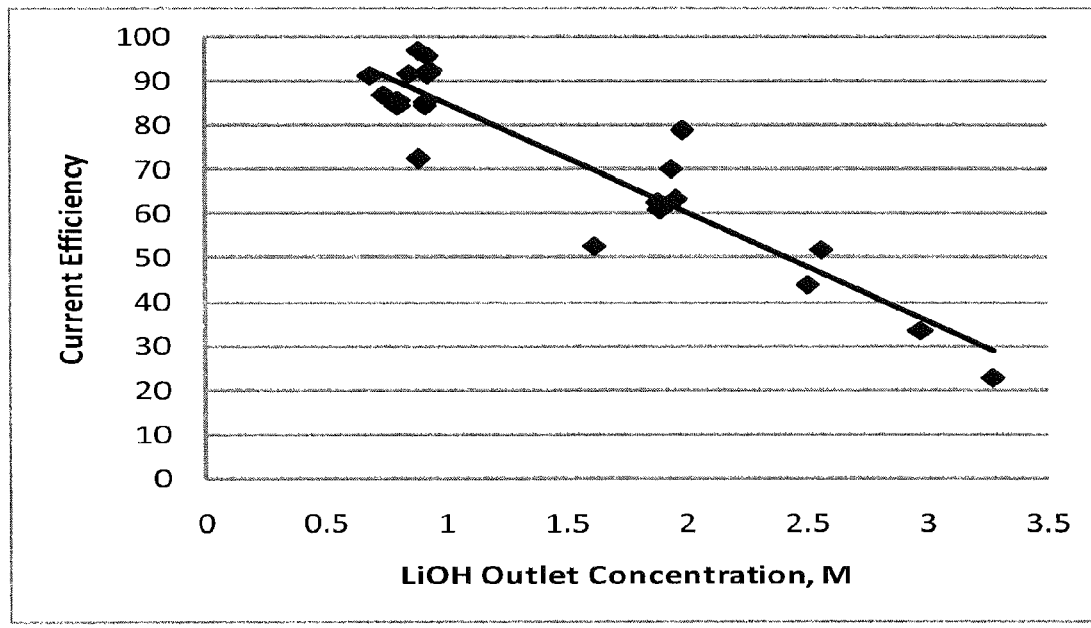
FIG. 8 is a graph showing the reduction in current efficiency observed at different LiOH outlet concentrations.
Figure 9:
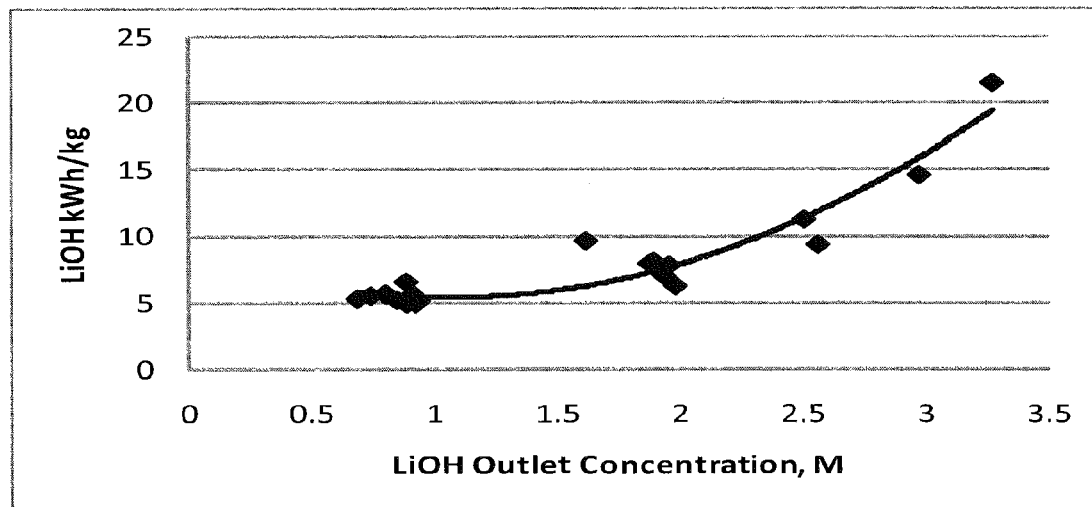
FIG. 9 is a graph showing energy consumption for production of LiOH at various outlet concentrations of LiOH.

The current efficiency decreases with increasing LiOH concentration, as shown in FIG. 8. This is likely due to increased back-migration of OH— anions across the membrane from the catholyte to anolyte as the LiOH concentration increases. As shown in FIG. 9, this phenomenon also resulted in an increased energy consumption because all experiments were performed at about the same current density and the cell voltage was essentially constant. The data suggests that the practical limiting concentration of LiOH is about 1-2 M, although it may be possible to identify a range of operating conditions or other membranes which would achieve a different result.

Table 3 summarizes the findings of this study and shows that the efficiency of LiOH production increases as the concentration of LiOH decreases, reaching an efficiency of between about 80-88% for concentrations of about 1 M (2.4 wt %) LiOH. Cell voltage is relatively independent of LiOH concentration, so efficiency also drives the energy requirement, which decreases to about 5 kWh per kg LiOH produced at a concentration of about 1 M. The LiOH production rate is also maximum (2.1-2.4 kg/m2/hr) at 2.4 wt % LiOH concentration.

TABLE 3

Summary of the main results of the experimental program.

| Test ID | LiOH (Start) M | LiOH (Final) M | Cell Voltage V | Water Add g/min | Efficiency % | Production Rate* kg LiOH/ m²/hr | Energy kWh/kg LiOH |
|---|---|---|---|---|---|---|---|
| June 8 | 2.57 | 3.28 | 4.37 | 0.5 | 35 | 0.94 | 15 |
| June 10 | 1.62 | 1.88 | 4.45 | 5 | 65 | 1.74 | 8 |
| June 12 | 0.94 | 0.92 | 4.28 | 11 | 80 | 2.14 | 5 |
| June 15 | 0.69 | 0.89 | 4.33 | 10 | 88 | 2.36 | 5.3 |

*Calculated from data (Production rate = 2.68 kg LiOH/m²/hr × efficiency).

Example 7

Purified Lithium Carbonate Starting from Solid Lithium Hydroxide

Dispersion

Solid lithium hydroxide monohydrate was fed at approximately 43.3 kg/hr to dispersion tank 40 via line 1, and recycled wash water and weak liquor are recycled via lines 21 and 22 respectively. The total flow rate to the tank being about 22 kg/min., about 80% of the flow was weak liquor and the remaining flow is wash water. The resulting mixture was a solution of lithium carbonate and hydroxide. The solution temperature was approximately 20° C.

Reaction

The rate of reaction for the conversion of lithium hydroxide to lithium carbonate and bicarbonate was controlled by maintaining a pH on the outlet side of the first reactor 45 at about 8.5. The $CO_2$ flow to the first reactor 45 was adjusted to maintain this pH. The $CO_2$ flow rate was about 300 L/min and the temperature of the solution exiting the reactor was increased to approximately 30° C., due to the heat of reaction. The solution temperature was cooled to 20° C. by way of the heat exchanger between the first and second two reactors, 45 and 50.

The second reactor converted the remaining unconverted lithium carbonate into lithium bicarbonate as $CO_2$ was fed to the second reactor at a flow rate of 275 L/min and the temperature on the outlet side of the reactor was increased to about 23° C. due to the heat of reaction.

The lithium bicarbonate solution was then passed through the same process and under the same conditions as in Example 1. First the solution passes through to the gas/solid/liquid separator 60, then through filtration 65 and 70, ion exchange 75 and to the precipitator 80 and on to filtration 85 and drying 90.

Resin

The lithium hydroxide monohydrate had a significantly lower concentration of calcium and magnesium than lithium carbonate. It was therefore possible to increase the time between regenerations to between 60 and 90 bed-volumes of strong liquor.

Filter Band

The flow rate of the second washing was adjusted to 3 L/min of deionized water heated to 92° C. The flow rate of the first wash was the same as in Example 1.

Drier

The dryer operated as described in Example 1, producing approximately 35.83 kg/hr of purified lithium carbonate. The chemical yield was at around 93%.

Example No. 8

Production of Lithium Carbonate

In FIG. 1, the system for the production of high purity and ultra high purity lithium carbonate includes dispersion tank 40 that is configured to provide a suspension of particles; first carbonation reactor 45, second carbonation reactor 50, $CO_2$ tank 55, gas/solid/liquid separation tank (degasser) 60, first filtration system 65 that includes filter bags, second filtration system 70 that includes filter cartridges, ion exchange columns 75, precipitator 80, belt filter 85, and dryer 90. Feed line 1 supplies impure carbonate to the reactor, feed to the first reactor is via line 2, $CO_2$ is fed to the first reactor via line 3, $CO_2$ is fed to the second reactor via line 4, lithium carbonate is fed to the second reactor via line 5, lithium carbonate from the second reactor is transferred to the decanter via line 6, a portion of the carbonate is returned to the first reactor via line 7, degassed $CO_2$ is removed via line 8, bicarbonate is supplied to filter bags via line 9, bicarbonate is supplied to the cartridges via line 10, bicarbonate is supplied to the ion exchange resin via line 11, bicarbonate is supplied to the precipitator via line 14, heat exchanger recirculation is via line 15, line 16 supplies a mixture of the recirculation from the precipitator and bicarbonate from the ion exchange resin to the precipitator, $CO_2$ separated by the precipitator is recycled via line 17, $CO_2$ from recycle line 17 and degasser line 8 is supplied to holding tank via line 18, carbonate is supplied to the filters via line 19, filtered carbonate is supplied from the filters to the dryer via line 20, weak liquor from the filters is supplied to the dispersion tank via line 21, recycled wash water is supplied from the filters to the dispersion tank via line 22, and wash water bleed is removed from the filters via line 23.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A method of producing high purity lithium carbonate, comprising the steps of:
   reacting a first aqueous solution comprising a technical grade $Li_2CO_3$ with $CO_2$ to form a second aqueous solution comprising $LiHCO_3$;
   separating unreacted $CO_2$ and insoluble compounds from the second aqueous solution using a gas-liquid-solid separator to produce a third aqueous solution;
   removing dissolved impurities from the third aqueous solution; and
   supplying the third aqueous solution to a reverse osmosis apparatus.

2. The method of claim 1, further comprising removing dissolved impurities from the third aqueous solution by contacting the third aqueous solution with an ion selective medium to produce a fourth aqueous solution and supplying the fourth aqueous solution following the filtration step to an ion exchange column to remove divalent ions.

3. The method of claim 1, wherein the insoluble compounds of the second aqueous solution are recycled back to the first step.

4. The method of claim 2, wherein lithium carbonate is recovered from the fourth aqueous solution by a solid-liquid separation step.

5. A method of producing high purity lithium carbonate, comprising the steps of:
   reacting a first aqueous solution comprising an impure lithium salt with carbon dioxide to form a second aqueous solution comprising dissolved $LiHCO_3$;
   separating unreacted $CO_2$ and insoluble compounds from the second aqueous solution using a gas-liquid-solid separator to produce a third aqueous solution,
   supplying the third aqueous solution to a reverse osmosis apparatus to concentrate the $Li_2CO_3$, wherein the reverse osmosis apparatus is operable to remove $CO_2$ from the solution;
   removing dissolved impurities from the third aqueous solution by contacting the third aqueous solution with an ion selective medium to produce a fourth aqueous solution; and
   precipitating $Li_2CO_3$ from the fourth aqueous solution, wherein the $Li_2CO_3$ has a purity of at least 99.99%.

6. The method of claim 5, further comprising supplying the fourth aqueous solution following the filtration step to an ion exchange column to remove divalent ions.

7. The method of claim 5, where in the impure lithium salt is selected from the group consisting of hydroxide, carbonate or aluminosilicate lithium salts.

8. The method of claim 5, wherein the insoluble compounds of the second aqueous solution are recycled back to the first step.

9. The method of claim 5, wherein the dissolved impurities of the third aqueous solution are removed by a filtration step.

10. The method of claim 9, wherein the filtration step is a microfiltration step.

11. The method of claim 5, wherein the lithium carbonate is recovered from the fourth aqueous solution by a solid-liquid separation step.

12. A method of regenerating an ion exchange resin, the method comprising the step of contacting the ion exchange resin with a strong acid and a lithium carbonate solution free of divalent ions to convert the resin to a lithium form.

13. The method of claim 12, wherein the resin is rinsed with water before contacting the lithium carbonate solution.

14. The method of claim 12, wherein the ion exchange resin is comprised of a polystyrene matrix cross linked with divinyl benzene.

* * * * *